3,761,456
PROCESS FOR THE POLYMERIZATION OF UNSATURATED POLYMERIZABLE COMPOUNDS
Kazuo Saito, Kyoto, and Shoji Okami, Kobe, Japan, assignors to Kanegafuchi Kagaku Kogyo Kabushiki Kaisha, Nakanoshima, Kita-ku, Osaka, Japan
No Drawing. Continuation of abandoned application Ser. No. 792,894, Dec. 30, 1968. This application Jan. 24, 1972, Ser. No. 220,420
Claims priority, application Japan, Dec. 30, 1967, 43/85,227; Apr. 9, 1968, 43/23,561
Int. Cl. C08f 1/28, 1/56
U.S. Cl. 260—87.3                         16 Claims

ABSTRACT OF THE DISCLOSURE

A process for the polymerization of unsaturated polymerizable compounds with the catalyst which is composed of (a) salts of metals belonging to the I–A and II groups of the periodic table, (b) aluminum organic compounds and (c) gem-polyhalogen compounds.

---

This is a continuation of application Ser. No. 792,894 filed Dec. 30, 1968, now abandoned.

DISCLOSURE

The present invention relates to a process for the polymerization of unsaturated polymerizable compounds with novel catalysts.

It is well known that such unsaturated polymerizable compounds as alpha-olefines are polymerized with Ziegler Natta type catalysts. The catalysts of this invention, unlike the Ziegler Natta type catalysts, contain no transition metal compounds belonging to the IV–VIII groups of the periodic table. Namely, (a) the salts of metals belonging to the I–A and II groups of the periodic table, (b) aluminium organic compounds, and (c) gem-polyhalogen compounds having a part in which more than two halogen atoms are bonded to one carbon atom, are for to joint use as the catalyst. Details follow:

As the salts of metals belonging to the I–A and II groups of the periodic table of (a) which are employed in the exercise of this invention, salts of lithium, sodium, potassium, rubidium, cesium, francium which belong to the I–A group; salts of beryllium, magnesium, calcium, strontium and barium which belong to the II–A group; and salts of zinc, cadmium and mercury which belong to the II–B group may be mentioned. Of these salts, representative are lithium chloride, sodium chloride, potassium chloride, cesium chloride, sodium sulfate, potassium sulfate, sodium bromide, potassium bromide, sodium iodide, potassium iodide, beryllium chloride, magnesium chloride, magnesium sulfate, calcium chloride, strontium chloride, barium chloride, zinc chloride, zinc bromide, zinc iodide, zinc sulfate, zinc oxide, cadmium chloride, mercury chloride and the like. Lithium chloride, sodium chloride, potassium chloride. Magnesium chloride, zinc chloride, zinc iodide and cadmium chloride are especially suitable. These salts are employed singly or in combination of more than two compounds. In using these salts, the joint use of appropriate inert solvents that are used in polymerization reactions in general, for example, aliphatic hydrocarbon or aromatic hydrocarbon group, ether group, thioether group, tertiary amine group, ester group and nitrile group is permissible. The salts of metals are then used in the form of solution or suspension in these solvents. The salts of metals of (a) are used in less than 10% by weight of the monomer, 0.01–1.5% being especially preferable.

Those compounds having alkyl or aryl radicals bonded to aluminium may be eligible for use as the aluminium organic compounds of (b). But if to illustrate, trimethyl aluminium, triethyl aluminium, tripropyl aluminium, triisobutyl aluminium, trioctyl aluminium, tridecyl alumminium, dimethyl aluminium, chloride, diethyl aluminium chloride, ethyl aluminium dichloride, ethyl aluminium sesquichloride, diethyl aluminium monoetoxyde, etc., may be mentioned. Of these compounds, triethyl aluminium is especially suitable. They are used singly or in combination of more than two compounds, and in amounts of less than 10% by weight of the monomer, 0.01–1.9% being especially suitable.

As the gem-polyhalogen compounds of (c) having a part in which more than two halogen atoms are bonded to one carbon atom, are used carbon tetrachloride, methyl trichloroacetate, ethyl trichloroacetate, ethyl dichloroacetate, trichloroacetonitrile, chloroform, bromoform, carbon tetrabromide, trichlorobromomethane, hexachloroethane, etc., especially carbon tetrachloride and ethyl trichloroacetate being preferable. These compounds are used singly or in combination of more than two of them, and in amounts of less than 20% by weight of the monomer, 0.01–4% being especially suitable.

The object monomers to be polymerized by the process of this invention are unsaturated polymerizable organic compounds. This invention has much to do with the polymerization of monoethylenically unsaturated compounds having vinylidene radical as the unsaturated radical, or such compounds having vinyl radical in place of the vinylidene radical, or still further such polyene series unsaturated compounds are conjugated diolefines. The representatives of these compounds include ethylene, propylene, butene-1, isobutylene, styrene, α-methylstyrene, butadiene, acrylonitrile, vinyl chloride, vinylidene chloride, vinyl acetate, methyl vinyl ether, isobutyl vinyl ether, methyl methacrylate, methyl acrylate, etc., or any combination thereof.

These catalysts are manufactured by mixing the compounds of the groups of (a), (b) and (c) mentioned above, undergoing reaction between them. This reaction may be carried out either within or without the polymerization reaction system. The fundamentals of this reaction are not completely elucidated as yet. The remarkable effects of the catalysts formed in this way on the polymerization of unsaturated polymerizable compounds will be reaffirmed by the embodiments described hereinafter.

While the conditions (temperature, pressure) of the manufacture of catalysts and the polymerization, differing depending on the kind of unsaturated polymerizable compound, the kind of catalyst composition, the degree of polymerization desired to be achieved and the kind of solvent, cannot be stipulated on a common denominator, in general, any temperature in the range of $-80$–$100°$ C., preferably $-60$–$30°$ C. may be usable in the case of manufacture of catalyst, and $-50$–$150°$ C., preferably 15–100 C. in the case of polymerization. The applicable pressure may be usually less than 100 atmospheric pressures, with pressures higher than this being permissible. For such volatile compounds as ethylene, the polymerization may be carried out under such a relatively moderate condition as 60 atmospheric pressures and 20° C. The degree of the effect of the catalytic action on the specific monomer is dependent for the most part on what kind of catalyst composition of (a), (b) and (c) is used.

According to this invention, the components of the catalyst of (a), (b) and (c) may be mixed into the polymerization system in many ways, representative of which are:

(1) (b) and (c) are simultaneously added to (a), and mixed therewith. Then, the monomer is added.
(2) The monomer is added to (c), and then (a) and (b) are added.

The manufacture of catalyst and the polymerization reaction may be carried out either by the batch system, semicontinuous system, or continuous system. It is not objectionable to use more than two monomers to be polymerized. Sometimes, copolymer is obtained. Or one or more of other monomers may be added during the reaction.

Principal effects or advantages derived from this invention are depicted as follows:

(1) It is possible to keep the catalytic system transparent and homogeneous.

Because no well-known catalytic system is used, the system can be always kept homogeneous by choosing appropriate catalyst composition.

(2) Quality polymers having no inclusion of the components of catalyst or residues are obtained.

This stems from the fact that no transition metal compounds are used. Because the catalyst components mentioned above and the reaction products, are all soluble in alcohol, water and so forth, these impurities may be readily removed by elusion, that is, washed away.

(3) Some unsaturated compounds of types that belong to entirely different groups as classified on the basis of polymerization properties, and which were considered incapable of polymerizable under usual catalytic systems, are made likewise polymerizable by the use of this catalytic system. As witness, clear evidences are given in the embodiments 6, 7 and 8 described hereunder.

EXAMPLE 1

A three mouthed flask of 50 cc. capacity equipped with a stirrer and a dropping funnel was employed in carrying out the experiment. 1.4 g. of zinc chloride and 10 cc. of tetrahydrofuran were put in this flask under nitrogen current, and then cooled down to −60° C. Under agitation, a liquid having 1.15 g. of triethyl aluminium in 10 cc. of tetrahydrofuran was dropped in, and successively, 1.53 g. of carbon tetrachloride dissolved in 10 cc. of tetrahydrofuran was dropped in, after which the system was heated to 20° C. During this interval, the system remained always colorless and transparent. After this, the resulting reaction solution was transferred to an autoclave of 45 cc. capacity made of stainless steel, ethylene was pressurized in at room temperature, and the pressure was brought to 60 atmospheric pressures. The autoclave was left undisturbed for 12 hours. After decreasing the pressure, methanol and hydrochloric acid were added to the system, thereby precipitating the formed polymer. The precipitate was filtered, washed and dried. In this way, white pure powdery polyethylene was obtained in 0.71 g.

In contrast, in other experiments made for comparison where the polymerization was carried out under identical condition except for lack of either one of catalyst components, the polymer was not obtained as shown in Table 1.

TABLE 1

|  | Zinc chloride, g. | Triethyl aluminium, g. | Carbon tetrachloride, g. | Formed polymer, g. |
| --- | --- | --- | --- | --- |
| This invention [1] | 1.4 | 1.15 | 1.53 | 0.7 |
| Contrast: |  |  |  |  |
| 1 | 0 | 1.15 | 1.53 | 0 |
| 2 | 1.4 | 0 | 1.53 | 0 |
| 3 | 1.4 | 1.15 | 0 | 0 |

[1] Example 1.

EXAMPLE 2

Under nitrogen current, 1.4 g. of zinc chloride and 10 cc. of ether were put in a three mouthed flask of 50 cc. capacity, and cooled down to −30° C. Under agitation, 1.15 g. of triethyl aluminium dissolved in 10 cc. of ether was dropped in, and then, 1.9 g. of ethyl trichloroacetate dissolved in 10 cc. of ether was dropped in, after which the reaction solution was heated to 20° C. During this interval, the system remained colorless and transparent.

Thereafter, ethylene was polymerized in the same way as in Example 1, into 1.41 g. of white polyethylene. It has not include the residue of catalyst.

EXAMPLE 3

Under nitrogen current, 0.95 g. of magnesium chloride and 10 cc. of hexane were put in a three mouthed flask of 50 cc. capacity, and cooled down to −50° C. Under agitation, 1.15 g. of triethyl aluminum dissolved in 10 cc. of hexane was dropped in, and successively, 1.53 g. of carbon tetrachloride dissolved in 10 cc. of tetrahydrofuran was added dropwise, after which the reaction solution was heated to 20° C. Thereafter, in the same way as in Example 1, ethylene was pressurized into this system to be polymerized into 1.92 g. of white powdery polyethylene. It has not include the residue of catalyst.

EXAMPLE 4

Under nitrogen current, 1.83 g. of cadmium chloride and 10 cc. of tetrahydrofuran were put in a flask, and cooled down to −15° C. Under agitation, 1.15 g. of triethyl aluminium dissolved in 10 cc. of tetrahydrofuran was dropped in, and successively, 10 cc. of tetrahydrofuran dissolving 1.53 g. of carbon tetrachloride therein was added dropwise, after which the reaction solution was heated to 15° C. Thereafter, ethylene was polymerized in the same way as in Example 1, into 1.08 g. of polyethylene. It has no inclusion of the components of catalyst.

EXAMPLE 5

Under nitrogen current, 3.2 g. of zinc iodide and 10 cc. of tetrahydrofuran were put in a flask, and cooled down to 15° C. Thereafter, in the same way as in Example 1, 0.53 g. of polyethylene was obtained.

EXAMPLE 6

In undertaking this experiment, a three mouthed flask of 50 cc. capacity equipped with a stirrer and a dropping funnel was furnished. Under nitrogen current, 1.4 g. of zinc chloride and 10 cc. of tetrahydrofuran were put in this flask, and cooled down to −60° C. Under agitation, 1.15 g. of trimethyl aluminium dissolved in 10 cc. of tetrahydrofuran was dropped in, and then 10 cc. of tetrahydrofuran dissolving 1.53 g. of carbon tetrachloride therein was added dropwise. Thereafter, the reaction solution was heated to 20° C. During this interval, the system remained colorless and transparent. This reaction solution, with addition of 20 g. of isobutyl vinyl ether, was left undisturbed at room temperature. Five minutes later, polymerization took place with violent generation of heat, causing the whole system to be solidified. By adding methanol and hydrochloric acid to this system, the polymer was precipitated. The precipitate was then filtered and dried to have 12.6 g. of the polymer.

EXAMPLE 7

Except for using 0.95 g. of magnesium chloride, the same method as in Example 6 was followed in preparing the catalyst. As this system, with addition of 20 g. of acrylonitrile, was left undisturbed, slurry-form polymer immediately began forming up. Thereafter, the polymerization proceeded moderately, and after 12 hours reaction, the whole system solidified. By adding to methanol and hydrochloric acid to this system, 4.5 g. of polyacrylonitrile was obtained in the same manner.

EXAMPLE 8

The catalytic system prepared in the same way as in Example 6, with addition of 20 g. of vinyl acetate, was let stand at room temperature. Twenty minutes later, polymerization took place with violent generation of heat, causing the whole system to be solidified. Thereafter, the same procedure was followed as in Example 6, and 15.1 g. of polymer was obtained.

EXAMPLE 9

The catalyst was prepared in the same way as in Example 1. This catalyst was transferred into an autoclave. Then, immediately after adding 9 g. of vinyl acetate, ethylene was pressurized in. Thereafter, the system was let stand for 12 hours under 60 atmospheric pressures and at room temperature. After gradually applying pressure, the polymer was precipitated by adding methanol and hydrochloric acid, then filtered, cleaned and dried. In this way, 4 g. of vinyl acetate-ethylene copolymer was obtained.

EXAMPLE 10

In undertaking this experiment, a three mouthed flask equipped with a stirrer and two dropping funnels was furnished. Under nitrogen current, 1.4 g. of zinc chloride and 10 cc. of tetrahydrofuran were put in this flask. Into this flask, a solution of 1.15 g. of triethyl aluminium dissolved in 10 cc. of tetrahydrofuran and the other solution of 10 cc. of tetrahydrofuran dissolving 1.53 g. of carbon tetrachloride therein were gradually added dropwise under agitation at 20° C. at the same time respectively from separate dropping funnels. After these solutions were dropped in, this reaction solution was stirred for two hours, and then transferred to an autoclave. Thereafter, ethylene was pressurized in at 20° C., and the pressure was brought to 60 atmospheric pressures. After twelve hours' standing, pressure was gradually decreased, and by adding a large amount of methanol and hydrochloric acid, the polymer was precipitated, which was then filtered, cleaned and dried. In this way, a white powdery polyethylene was obtained in 0.61 g.

EXAMPLE 11

A three mouthed flask of 50 cc. capacity and equipped with a stirrer and a dropping funnel was employed in carrying out the experiment. 0.42 g. of lithium chloride and 10 cc. of tetrahydrofuran were put in this flask under nitrogen current, and then cooled down to —60° C. Under agitation, a liquid having 1.15 g. of triethyl aluminium in 10 cc. of tetrahydrofuran was dropped in, and successively, 1.53 g. of carbon tetrachloride dissolved in 10 cc. of tetrahydrofuran was dropped in, after which the system was heated to 20° C. During this interval, the system remained always colorless and transparent. After this, reaction solution was transferred to an autoclave of 4.5 cc. capacity made of stainless steel, ethylene was pressurized in, and the pressure was brought to 60 atmospheric pressures. The autoclave was left undisturbed for 12 hours. After graduadlly decreasing the pressure, methanol and hydrochloric acid were added to the system, thereby precipitating the formed polymer. The precipitate was filtered, washed and dried. In this way, gray powdery polyethylene was obtained in 0.89 g.

EXAMPLE 12

Under nitrogen current, styrene, vinyl acetate, methyl methacrylate and acrylonitrile were respectively put in separate test tubes, and then 1 cc. of the reaction solution obtained in Example 11 were respectively dropped in. The test tubes were left undisturbed for 12 hours at room temperature. Methanol and hydrochloride acid were added to the systems, thereby precipitating the formed polymers. The precipitate was filtered, washed and dried. The result was shown in Table II. The obtained polymers have not residues of catalyst.

TABLE II

| | Monomer, cc. | Formed polymer, g. |
|---|---|---|
| Styrene | 1.15 | 0.11 |
| Vinyl acetate | 0.92 | 0.33 |
| Methyl methacrylate | 1.06 | 0.73 |
| Acrylonitrile | 0.66 | 0.10 |

EXAMPLE 13

.2 g. of sodium chloride and 20 cc. of tetrahydrofuran were put in a three mouthed flask equipped with a stirrer and a dropping funnel, and then cooled down to —15° C. Under agitation, a liquid having 2.34 g. of triethyl aluminum in 20 cc. of tetrahydrofuran was dropped in, and successively, 3.0 g. of carbon tetrachloride dissolved in 20 cc. of tetrahydrofuran was dropped in, after which the system was heated to 20° C. After 20 cc. of reaction solution was transferred to an autoclave, ethylene was pressurized in, and the pressure was brought to 60 atmospheric pressures. The autoclave was left undisturbed for 20 hours. After gradually decreasing the pressure, methanol and hydrochloric acid were added to the system, thereby precipitating the formed polymer. The precipitate was filtered, washed and dried. In this way, white powdery polyethylene was obtained in 1.21 g.

EXAMPLE 14

Isobutyl vinylether, styrene, vinyl acetate, methyl methacrylate and acrylonitrile were respectively put in separate test tubes in amount of 4 cc., and then 4 cc. of the reaction solution obtained in Example 13 were respectively dropped in. The test tubes were left undisturbed for 18 hours at room temperature. Thereafter, the same procedure was followed as in Example 12. The result was shown in Table III.

TABLE III

| | Monomer, cc. | Formed polymer, g. |
|---|---|---|
| Isobutyl vinylether | 4.0 | 0.32 |
| Styrene | 4.0 | 0.97 |
| Vinyl acetate | 4.0 | 0.53 |
| Methyl methacrylate | 4.0 | 0.72 |
| Acrylonitrile | 4.0 | 0.36 |

EXAMPLE 15

Under nitrogen current, 1.5 g. of potassium chloride and 20 cc. of tetrahydrofuran were put in a three mouthed flank equipped with a stirrer and a dropping funnel, and then cooled down to —40° C. Under agitation, a liquid having 2.34 g. of triethyl aluminum in 20 cc. of tetrahydrofuran was dropped in, and successively, 3.0 g. of carbon tetrachloride dissolved in 20 cc. of tetrahydrofuran was dropped in, after which the system was heated to 20° During this interval, the system remained always colorless and transparent. After 20 cc. of the reaction solution was transferred to an autoclave, ethylene was pressurized in at room temperature, and the pressure was brought to 60 atmospheric pressures. The autoclave was left undisturbed for 20 hours. After gradually decreasing the pressure, methanol and hydrochloic acid were added to the system, thereby precipitating the formed polymer. The precipitate was filtered, washed and dried. In this way, while powdery polyethylene was obtained in 1.79 g.

EXAMPLE 16

Using 4 cc. of the reaction solution obtained in Example 15, unsaturated monomers were polymerized in the same way as in Example 14. The result was shown in Table IV.

TABLE IV

| | Monomer, cc. | Formed polymer, g. |
|---|---|---|
| Styrene | 4.0 | 0.13 |
| Vinyl acetate | 4.0 | 2.36 |
| Methyl methacrylate | 4.0 | 0.74 |
| Acrylonitrile | 4.0 | 0.29 |

EXAMPLE 17

In undertaking this experiment, a four mouthed flask equipped with a stirrer and two dropping funnels was furnished. Under nitrogen current, 1.5 g. of potassium chloride and 20 cc. of tetrahydrofuran were put in this flask. Into this flask, a solution of 2.34 g. of triethyl aluminum dissolved in 20 cc. of tetrahydrofuran and the other solution of 20 cc. of tetrahydrofuran dissolving 3.0 g. of carbon tetrachloride therein were gradually added dropwise under agitation at 20° C. at the same time respectively from separate dropping funnels. After these solutions were dropped in, this reaction solution was stirred for several hours, and then 20 cc. of the reaction solution transferred to an autoclave. Thereafter, ethylene was pressurized in, and the pressure was brought to 60 atmospheric pressures. After twelve hours standing, pressure was gradually decreased and by adding methanol which was then filtered, cleaned and dried. In this way, a white powdery polyethylene was obtained in 1.53 g.

EXAMPLE 18

20 cc. of the same reaction solution prepared as in Example 15 was put in autoclave, and successively, 5 cc. of vinyl acetate was dropped in. Immediately after which ethylene was pressurized in, and the pressure was brought to 60 atmospheric pressures. The autoclave was left undisturbed for 15 hours. After decreasing the pressure, petroleum ether and hydrochloric acid were added to the system, thereby precipitating the formed polymer. The precipitate was filtered, washed and dried. In this way, vinyl acetate-ethylene copolymer was obtained in 3.2 g.

EXAMPLE 19

Under nitrogen current, 1.40 g. of zinc chloride, 0.96 g. of magnesium chloride and 20 cc. of tetrahydrofuran were put in a flask of 50 cc. capacity, and then cooled down to −60° C. Under agitation, a liquid having 1.15 g. of triethyl aluminium in 10 cc. of tetrahydrofuran was dropped in, and successively, 1.53 g. of carbon tetrachloride dissolved in 10 cc. of tetrahydrofuran was dropped in, after which the system was heated to 20° C. After this, reaction solution was transferred to an autoclave of 50 cc. capacity, ethylene was pressurized in, and the pressure was brought to 60 atmospheric pressures. The autoclave was left undisturbed for 18 hours. After decreasing the pressure, methanol and hydrochloric acid were added to the system, thereby precipitating for formed polymer. The precipitate was filtered, washed and dried. In this way, white pure powdery polyethylene was obtained in 0.68 g.

EXAMPLE 20

Isobutyl vinylether, methyl methacrylate and acrylonitrile were respectively put in test tubes under nitrogen current, and then 5 cc. of the reaction solution obtained in Example 19 was dropped in. The test tubes were left undisturbed for 18 hours at room temperature. Methanol and hydrochloride acid were added to the systems, thereby precipitating the formed polymers. The precipitate was filtered, washed and dried. The result was shown in Table V.

TABLE V

| | Monomer, cc. | Formed polymer, g. |
|---|---|---|
| Isobutyl vinylether | 5 | 3.09 |
| Methyl methacrylate | 5 | 0.65 |
| Acrylonitrile | 5 | 9.41 |

EXAMPLE 21

Under nitrogen current, 0.60 g. of sodium chloride, 0.75 g. of potassium chloride and 20 cc. of tetrahydrofuran were put in a three mouthed flask of 50 cc. capacity, and then cooled down to −60° C. Under agitation, a liquid having 1.15 g. of triethyl aluminium in 10 cc. of tetrahydrofuran was dropped in, and successively, 1.55 g. of carbon tetrachloride dissolved in 10 cc. of tetrahydrofuran was dropped in, after which the system was heated to 20° C. After this, reaction solution was transferred to an autoclave, ethylene was pressurized in, and the pressure was brought to 60 atmospheric pressures. The autoclave was left undisturbed for 18 hours. After decreasing the pressure, methanol and hydrochloric acid were added to the system, thereby precipitating the formed polymer. The precipitate was filtered, washed and dried. In this way, white pure powdery polyethylene was obtained in 2.14 g.

EXAMPLE 22

Vinyl acetate, methyl methacrylate and acrylonitrile were respectively put in test tubes under nitrogen current, and then 5 cc. of the reaction solution obtained in Example 21 was dropped in. Thereafter, the same procedure was followed in Example 20. The polymers were obtained as shown in Table VI.

TABLE VI

| | Monomer, cc. | Formed polymer, g. |
|---|---|---|
| Vinyl acetate | 5 | 2.63 |
| Methyl methacrylate | 5 | 1.43 |
| Acrylontrile | 5 | 0.36 |

EXAMPLE 23

Under nitrogen current, 0.75 g. of potassium chloride, 1.40 g. of zinc chloride and 20 cc. of tetrahydrofuran were put in a three mouthed flask of 50 cc. capacity, and then cooled down to −60° C. Under agitation, a liquid having 1.15 g. of triethyl aluminium in 10 cc. of tetrahydrofuran was dropped in, and successively, 1.53 g. of carbon tetrachloride dissolved in 10 cc. of tetrahydrofuran was dropped in, after which the system was heated to 20° C. After this, reaction solution was transferred to an autoclave of 50 cc. capacity, ethylene was pressurized in, and the pressure was brought to 60 atmospheric pressures. The autoclave was left undisturbed for 18 hours. After decreasing the pressure, methanol and hydrochloric acid were added to the system, thereby precipitating the formed polymer. The precipitate was filtered, washed and dried. In this way, white pure powdery polyethylene was obtained in 0.81 g.

EXAMPLE 24

Under nitrogen current, isobutyl vinylether, styrene, vinyl acetate, methyl methacrylate and acrylonitrile were put in test tubes, and then 4 cc. of the reaction solution prepared in Example 23 was dropped in. The test tubes were left undisturbed for 18 hours at room temperature. Methanol and hydrochloride acid were added to the systems, thereby precipitating the formed polymers. The precipitate was filtered, washed and dried. The result was shown in Table VII. The polymers were all pure.

TABLE VII

| | Monomer, cc. | Formed polymer, g. |
|---|---|---|
| Isobutyl vinylether | 4 | 2.80 |
| Styrene | 4 | 0.10 |
| Vinyl acetate | 4 | 0.10 |
| Methyl methacrylate | 4 | 1.26 |
| Acrylonitrile | 4 | 0.31 |

What is claimed is:

1. Process for polymerizing or copolymerizing ethylenically unsaturated monomer selected from the group consisting of ethylene, isobutyl vinyl ether, acrylonitrile, vinyl acetate, methyl methacrylate, and mixture of acetate and ethylene, wherein the following components are jointly used therein as a catalyst
   (A) salt of metals belonging to the Group II of the periodic chart;
   (B) aluminium organic compound having alkyl or aryl radicals bonded to aluminium; and
   (C) second compound selected from the group consisting of carbon tetrachloride, methyl trichloroacetate, ethyl trichloroacetate, trichloroacetonitrile, chloroform, bromoform, carbon tetrabromide, trichlorobromethane, hexachloroethane, and mixtures thereof.

2. Process of claim 1 wherein said polymerization is in the presence of a cyclic ether.

3. Process of claim 1, wherein said cyclic ether is tetrahydrofuran or ether.

4. Process of claim 1, wherein components (A) and (B) are respectively used in an amount less than 10 percent by weight of the monomer, and component (C) is used in an amount less than 20 percent by weight of said monomer.

5. Process of claim 1, wherein polymerization is carried out at a temperature within the range of −50° C. to 150° C.

6. Process of claim 5, wherein the reaction is at a pressure less than 100 atmospheres.

7. Process according to claim 1, wherein said monomer is first added to component (C), then components (A) and (B) are added to the resulting mixture.

8. Process of claim 1, wherein said components (B) and (C) are simultaneously added to component (A) and mixed therewith, and thereupon said one component to be polymerized is added thereto.

9. Process of claim 1, wherein said component (C) is carbon tetrachloride and/or ethyl trichloroacetate.

10. Process of claim 1, wherein said component (C) is used in an amount ranging from 0.01 to 4% by weight of said one component to be polymerized.

11. Process of claim 1, wherein said component (A) is in an amount of from 0.01 to 1.5% by weight of said one component to be polymerized.

12. Process of claim 1, wherein said component (B) is in an amount of from 0.01 to 1.5% by weight of said one component to be polymerized.

13. Process of claim 5, wherein said reaction temperature is from 15° C. to 100° C.

14. Process of claim 1, wherein the temperature is from −60° C .to 30° C. of catalyst production.

15. Process of claim 1, wherein the compounds of groups (A) and (B) are used respectively, in an amount ranging from 0.01 to 1.5 percent by weight of said compounds to be polymerized, and the component (C) is used in an amount ranging from 0.01 to 4 percent by weight of said compounds to be polymerized.

16. Process of claim 1, wherein said catalyst is produced at a temperature of from −80° C. to 100° C.

References Cited
UNITED STATES PATENTS

| | | | |
|---|---|---|---|
| 3,432,513 | 3/1969 | Miller et al. | 260—93.7 |
| 3,647,753 | 3/1972 | Nakaguchi et al. | 260—63 R |

OTHER REFERENCES

Razuvayev, G. A. et al.: Polymer Science, U.S.S.R., vol. 7, 1965, pp. 597–604.

JOSEPH L. SCHOFER, Primary Examiner

J. KIGHT, Assistant Examiner

U.S. Cl. X.R.

252—428, 429 A, B, C, 431 R; 260—80 C, 83.5 M, L, 85.7, 86.1 R, 88.2 R, 89.1, 89.5, 89.5 A, 91.1 A, 94.9 B, C, CA